United States Patent [19]

Standler et al.

[11] Patent Number: 4,822,411
[45] Date of Patent: Apr. 18, 1989

[54] INTEGRATED STEEL MILL ARRANGEMENT

[75] Inventors: Gerhard Standler; Siegfried Zeller, both of Linz; Konstantin Milionis, Graz; Rudolf Zeller, Linz, all of Austria

[73] Assignee: Voest-Alpine Aktiengesellschaft, Linz, Austria

[21] Appl. No.: 35,988

[22] Filed: Apr. 8, 1987

[30] Foreign Application Priority Data

May 7, 1986 [EP] European Pat. Off. ............ 86890130

[51] Int. Cl.⁴ .............................................. C21B 13/14
[52] U.S. Cl. ........................................ 75/35; 266/142; 266/156
[58] Field of Search ................... 75/40, 35, 33, 43; 266/44, 156, 144, 142

[56] References Cited

U.S. PATENT DOCUMENTS 4,007,034  2/1977  Hartwig et al. .................... 75/40
4,234,624  11/1980  Wagener et al. .................... 75/35
4,575,394  3/1986  Nixon ................................. 75/33

Primary Examiner—S. Kastler
Attorney, Agent, or Firm—Hopgood, Calimafde, Kalil, Blaustein & Judlowe

[57] ABSTRACT

When operating mills including a coling plant, a blast furnace arrangement and a converter steelworks, large amounts of partially high-grade so-called cupola gases, such as coke oven gas and converter exhaust gases, form, which cupola gases, so far. In order to render these cupola gases utilizable at a better efficiency, thus reducing the specific energy consumption per ton of crude steel produced, and in order to be less dependent on external scrap, a plant for directly reducing iron ore is additionally adjoined to the mill. The ducts for the exhaust gas from the converters and the coke oven gas ducts from the coking plant are connected to a reformer to produce reducing gas substantially containing CO and H. The reformer is connected with the direct reduction plant via a reducing gas duct.

5 Claims, 1 Drawing Sheet

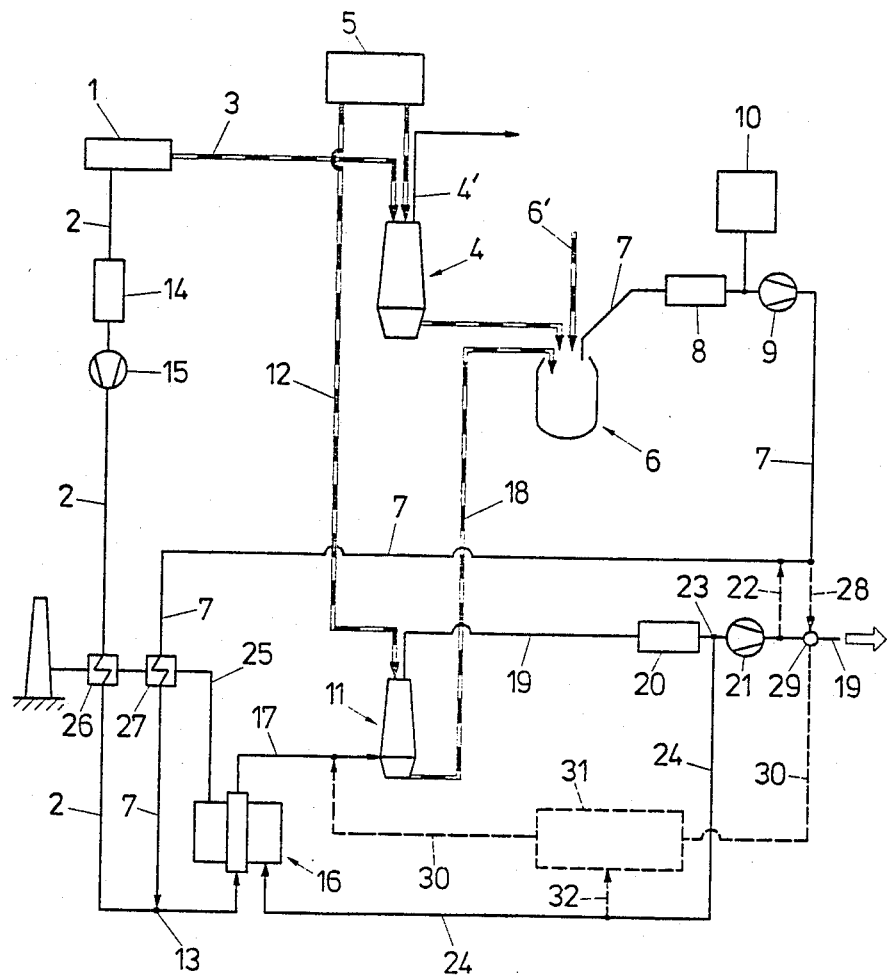

INTEGRATED STEEL MILL ARRANGEMENT

The invention relates to an integrated mill comprising a coking plant, a blast furnace arrangement and a converter steelworks.

To produce steel according to the oxygen blowing process in oxygen top-blowing converters, in bottom-blowing converters or in converters with which these types of blowing are applicable in combination, by partial utilization of ferrous solids, molten pig iron is required. This is produced in the blast furnace arrangement by means of high-grade metallurgical coke, the latter being supplied from the coking plant. In dependence on the analysis and on the sensible heat of the molten pig iron, solid iron carriers, in particular scrap, are fed to the converters as coolants, the addition of external scrap sometimes having the disadvantage that undesired accompanying elements that cannot be removed will be introduced into the steel produced.

When operating mills of this type, large amounts of partially high-grade so-called cupola gases, such as coke oven gas and converter exhaust gases, form, which cupola gases, so far, have been utilized only partially, e.g., for heating purposes, to generate steam or—at a low efficiency only—to produce current.

The invention aims at avoiding these disadvantages and has as its object to render the incurring cupola gases, i.e., coke oven gas and converter exhaust gases, in an integrated mill of the initially defined kind utilizable at a better efficiency than so far, to increase, at the same time, the amount of steel produced without expansion of the capacities of the blast furnace arrangement and of the coking plant, and to ensure a high purity of the steel by largely excluding impurities of an unknown kind.

A further significant aim of the present invention consists in reducing the specific energy consumption per ton of crude steel produced, i.e., the amount of primary energy required per ton of crude steel.

This object is achieved according to the invention in that a plant for directly reducing iron ore is additionally adjoined to the mill, that the ducts for the exhaust gas from the converters and the coke oven gas ducts from the coking plant are connected to a reformer to produce reducing gas substantially containing CO and $H_2$, and that the reformer is connected with the direct reduction plant via a reducing gas duct.

The direct reduction plant, in particular, may comprise one or several shaft furnaces. However, it is also possible to use other known reducing aggregates, such as fluidized layer and fluidized bed reactors.

The methane contained in the coke oven exhaust gas is reacted in the reformer with the $CO_2$ and steam contained in the converter exhaust gas, according to the equations $$CH_4 + H_2O \rightleftharpoons CO + 3H_2$$

$$CH_4 + CO_2 \rightleftharpoons 2CO + 2H_2$$

$$CO_2 + H_2 \rightleftharpoons CO + H_2O.$$

Advantageously, a gas reservoir is arranged in the exhaust ducts from the converters to the reformer.

The exhaust gas discontinuously incurring from the converters during blowing is collected in the gas reservoir or balancing vessel and may be continuously given off to the reformer.

It is also possible to operate several converters in blowing cycles temporally offset relative to each other in order to have available to the reformer converter exhaust gas without interruption.

With the mill in operation, the sponge iron produced in the direct reduction plant suitably is charged into the converters.

According to a preferred embodiment, the sponge iron produced in the direct reduction plant is charged into the converters in hot condition.

In this manner, only a comparatively slight amount of heat is withdrawn from the molten pig iron in the converters for melting the sponge iron. The sponge iron makes up for part of the pig iron and/or the scrap.

Preferably, even solid carbon carriers are introduced into the metal melt contained in the converters in order to reduce iron oxide residues still contained therein and to adjust the desired carbon content.

According to a further embodiment of the process according to the invention, the reducing gas extracted from top of the direct reduction plant and partially reacted and, if desired, a portion of the exhaust gas from the converters are largely freed from the carbon dioxide contained therein, and the deacidified gas mixture thus obtained is admixed with the reducing gas as recirculating gas. By this measure, the amount of sponge iron produced is increased without simultaneously requiring more coke oven gas. Since more sponge iron incurs, it is, therefore, possible to even further reduce the amount of scrap to be added.

A mill according to the invention is illustrated in the drawing by way of a block diagram.

The mill comprises a coking plant denoted by 1 in the block diagram; from this, coke oven gas is extracted via a duct 2, the solid coke, via a conveyor 3, getting into the blast furnace arrangement 4, of which just one blast furnace is schematically illustrated. The latter is charged from the ore feeder 5 also with lumpy ore—if desired, in sintered condition. Blast furnace gas is discharged through duct 4'. The pig iron produced in the blast furnace is transferrd into the converter steelworks 6, which may comprise several converters, and is converted into crude steel. Scrap may be added via conveying duct 6'. The converter exhaust gas forming during the conversion (blowing) process is extracted by duct 7, the crude steel produced is tapped from the converters. In the converter exhaust gas duct 7, a gas cooling and purifying means 8 as well as a compressor 9 are provided. Furthermore, it is suitable to install a gas reservoir 10 in the exhaust duct 7.

According to the invention, the plant parts described are combined with a plant 11 for the direct reduction of iron ore, which—as illustrated—advantageously is designed as at least one shaft furnace. This direct reduction plant 11 is charged with lumpy ore or pellets from the ore feeder 5 via duct 12. The converter exhaust gas duct 7, at 13, is united with the coke oven gas duct 2, in which a means 14 for purifying and cooling the coke gas as well as a compressor 15 are provided, the mixed gas being conducted into a reformer 16. In the reformer, a reducing gas essentially consisting of CO and $H_2$ is produced from this mixed gas, which is fed into the direct reduction plant 11 via a reducing gas duct 17. The sponge iron formed is removed from the direct reduction plant 11 and—optionally in a hot-briquetted state from a briquetting means (not illustrated) following upon the reduction plant—is charged into the converters of the converter steelworks 6 by a transporting means 18. The partially reacted reducing gas, the exhaust gas from the direct reduction plant or top gas from top of the direct reduction plant 11 is discharged through a top gas duct 19, in which, in the exemplary embodiment illustrated, a gas cooling and purifying aggregate 20 as well as a compressor 21 are incorporated. Part of the top gas, upon compression in the compressor 21, may be fed into the converter exhaust gas conducting duct 7 via duct 22 illustrated in broken lines and supplied to the reformer 16. The duct 24 branching off at 23 takes purified top gas to the reformer 16, where it is suitably burnt to heat the catalyst pipes of the reformer. The thermal content of the combustion gas extracted from the reformer through duct 25, according to the embodiment illustrated, is still utilized in recuperators 26 and 27 to preheat the coke oven gases in duct 2 as well as the converter exhaust gases in duct 7.

According to a variant likewisely illustrated in broken lines, the converter exhaust gas duct 7 may be connected with the top gas duct 19 by means of an admixing duct 28, wherein, in a mixing head 29, the quantitative portions of the gases supplied through a recirculating gas duct 30 leading away from the mixing head 29 and through the reducing gas duct 17 for the direct reduction plant 11 may be controlled. A means 31 for separating $CO_2$ (deacidification) from the purified and compressed top gas, optionally mixed with converter exhaust gas, as well as for preheating the deacidified gas mixture is incorporated in the recirculating gas duct 30. For the purpose of heating, purified top gas from duct 24 may be supplied to means 31 through branch duct 32.

In each individual duct, blocking, diverting and controlling organs (not illustrated) may additionally be provided.

From the following description, further details with regard to the structure and operation of the integrated mill according to the invention will become apparent.

The plants united to such a mill, for instance, may have the following capacities to produce $4.2 \times 10^6$ tons per year (t.p.y.) of crude steel:

| Coking plant | |
|---|---|
| Coke production: | 1.2 mill. t.p.y. incl. 0.08 mill. t.p.y. breeze |
| Coal charged: | 1.74 mill. t.p.y. (wet) |
| Coke oven gas, net: | 540 mill. m³/year |
| Blast furnace arrangement | |
| 2 Blast furnaces | 4,200 tons/day each |
| Production: | 2.65 mill. t.p.y. pig iron |
| Coal blowing: | 350,000 t.p.y. |
| Blast furnace gas, net: | 3.786 mill. m³/year |
| Converter steelworks | |
| 4 × 140 ton-converters with CO-gas recovery, output about 90 percent | |
| Direct reduction plant | |
| Shaft furnaces as 2 × 750,000 t.p.y.-modules | |
| Top gas, net: | 2,265 mill. m³/year |

All volume data are based on the normal condition of the gases.

"Net" refers to the total production, own consumption deducted.

In the following Table, typical compositions of the gases produced in the mill are indicated:

| Constituent | Converter exhaust gas [% vol.] | Coke oven gas [% vol.] | Blast furnace gas [% vol.] | Top gas after scrubber (20) [% vol.] | Reduction gas [% vol.] |
|---|---|---|---|---|---|
| CO | 70 | 6 | 24 | 50 | 60.9 |
| $H_2$ | 5 | 61.6 | 2 | 20 | 27.3 |
| $CO_2$ | 15 | 1.6 | 19 | 20 | 3.4 |
| $N_2$ | 10 | 2.0 | 55 | 0.75 | 0.6 |
| $H_2O$ | — | — | — | 9.3 | 5 |
| $CH_4$ | — | 26.1 | — | — | 0.02 |
| C | — | 0.1 | — | — | — |
| $O_2$ | — | — | — | — | — |
| S | — | — | — | — | — |
| $H_U$ [kWh/m³] | 2.33 | 5.81 | 1.05 | 2.15 | |

For further clarification, the following exemplary embodiment serves, which has been based on the production of 1 ton crude steel (CS) by using an integrated mill operating in the manner described above.

EXAMPLE

Quantity and energy balance of each plant part:

| Coking plant | |
|---|---|
| Input into coke ovens: | |
| Coke coal dry | 375 kg/$t_{CS}$ |
| Output: | |
| Coke and coke breeze | 281 kg/$t_{CS}$ |
| Coke oven gas net | 128 m³/$t_{CS}$ |
| Therm. energy Coke oven gas net | 731 kWh/$t_{CS}$ |
| Blast furnace arrangement (including sintering plant) | |
| Input: | |
| Ore in sintered form | 906 kg/$t_{CS}$ |
| Coal | 140 kg/$t_{CS}$ |
| Coke | 281 kg/$t_{CS}$ |
| Output: | |
| Pig iron | 630 kg/$t_{CS}$ |
| Blast furnace gas net | 645 m³/$t_{CS}$ |
| Therm. energy Blast furnace gas | 678 kWh/$t_{CS}$ |

Blast furnace gas for one part is burnt in the mill itself (preheating furnaces), for the other part is converted into current in a power station.

| Reformer | |
|---|---|
| Input: | |
| Coke oven gas | 128 m³/$t_{CS}$ |
| Converter exhaust gas | 200 m³/$t_{CS}$ |
| Top gas from direct reduction plant | 140 m³/$t_{CS}$ |
| Output: | |
| Reducing gas | 540 m³/$t_{CS}$ |
| Direct reduction shaft furnace | |
| Input: | |
| Reducing gas | 540 m³/$t_{CS}$ |
| Ore in pellet form | 265 kg/$t_{CS}$ |
| Ore in lumpy form | 255 kg/$t_{CS}$ |
| Output: | |
| Directly reduced iron (DRI, sponge iron) | 360 kg/$t_{CS}$ |
| Top gas | 540 m³/$t_{CS}$ |
| Therm. energy top gas | 465 kWh/$t_{CS}$ |
| Converter steelworks | |
| Input: | |
| Pig iron | 630 kg/$t_{CS}$ |
| DRI | 360 kg/$t_{CS}$ |
| Scrap and fluxes | 130 kg/$t_{CS}$ |

-continued

| Output: | |
|---|---|
| Crude steel | 1 t |
| Converter exhaust gas | 200 m$^3$/t$_{CS}$ |

The charging substances and the products had the following compositions:

| | Lumpy ore | Sinter | Pellets | DRI | Pig iron | Crude steel |
|---|---|---|---|---|---|---|
| Total Fe % | 65 | 67 | 67 | 92.1 | 94.4 | — |
| C % | — | — | — | 1.5 | 4 | 0.25 |
| Al$_2$O$_3$ and SiO$_2$ % | 4.6 | 1.5 | 2.5 | 3.4 | — | — |
| Si % | — | — | — | — | 0.5 | — |
| Mn % | 0.04 | 0.3 | — | — | 1.0 | — |
| P % | 0.05 | 0.05 | 0.025 | 0.043 | 0.08 | 0.035 |
| S % | 0.013 | 0.011 | 0.02 | 0.014 | 0.04 | 0.035 |

It goes without saying that it is also possible according to the invention to use charging substances having qualities that differ from the analysis values indicated.

A comparison of the energy balance for the production of 1 ton crude steel in an integrated mill according to the invention with that of a conventional mill operating without direct reduction plant shows a reduction of the specific energy consumption (based on one ton crude steel produced) of about 1.77 GJ (about 21.77 GJ/t crude steel conventionally as compared to about 20.0 GJ/t crude steel according to above example).

What we claim is:

1. A process for operating an integrated mill comprising a coking plant, a blast furnace arrangement, a converter steelworks including at least one converter, and a direct reduction plant, said process comprising:
   conducting exhaust gas consisting essentially of CO and CO$_2$ from said at least one converter via first duct means to a reformer,
   conducting coke oven gas consisting essentially of H$_2$ and CH$_4$ from said coking plant via a second duct means to said reformer,
   forming a reducing gas containing substantially CO and H$_2$ in said reformer from said exhaust gas and said coke oven gas without additional supply of oxygen or carbonaceous material,
   conducting said reducing gas to said direct reduction plant to convert iron ore in said reduction plant to sponge iron, and feeding said sponge iron to said at least one converter 2. A process as set forth in claim 1, wherein said sponge iron produced in said direct reduction plant is charged into said converter in hot condition.

3. A process as set forth in claim 1, wherein said converter contains metal melt and solid carbon carriers are introduced into said metal melt.

4. A process as set forth in claim 1, wherein partially reacted reducing gas is extracted from top of said direct reduction plant and is largely freed from carbon dioxide contained therein so as to obtain a deacidified gas, said deacidified gas being admixed with said reducing gas as recirculating gas.

5. A process as set forth in claim 1, wherein partially reacted reducing gas is extracted from top of said direct reduction plant, exhaust gas is discharged from said converters, and said partially reacted reducing gas with part of said exhaust gas are freed from carbon dioxide contained therein so as to obtain a deacidified gas mixture, said deacidified gas mixture being admixed with said reducing gas as recirculating gas.

* * * * *